Dec. 12, 1939.  E. W. KRUG  2,183,221
COOLING DEVICE FOR LIQUIDS
Filed Aug. 25, 1938  3 Sheets-Sheet 1
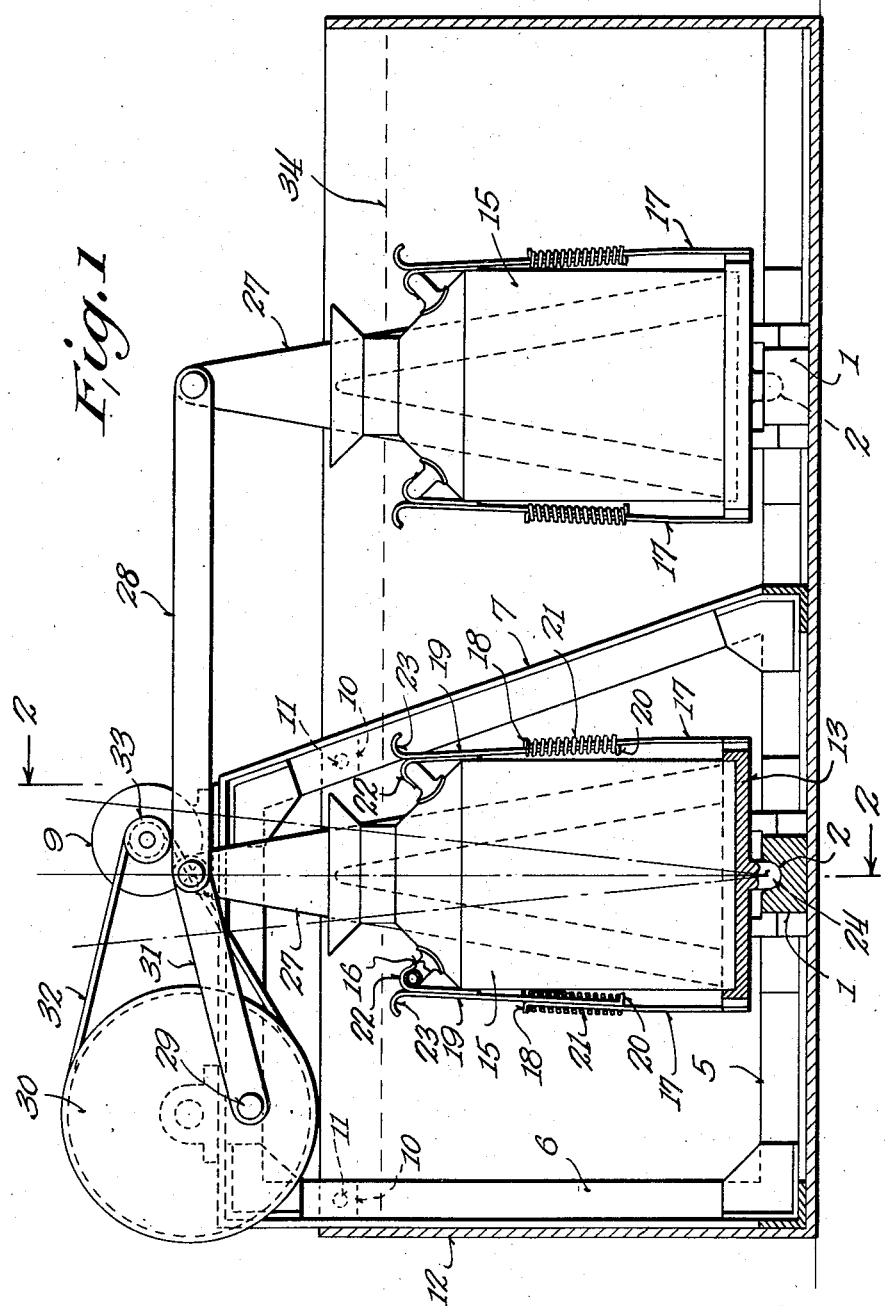
INVENTOR.
EMIL W. KRUG
BY
ATTORNEY Dec. 12, 1939.  E. W. KRUG  2,183,221
COOLING DEVICE FOR LIQUIDS
Filed Aug. 25, 1938  3 Sheets-Sheet 2
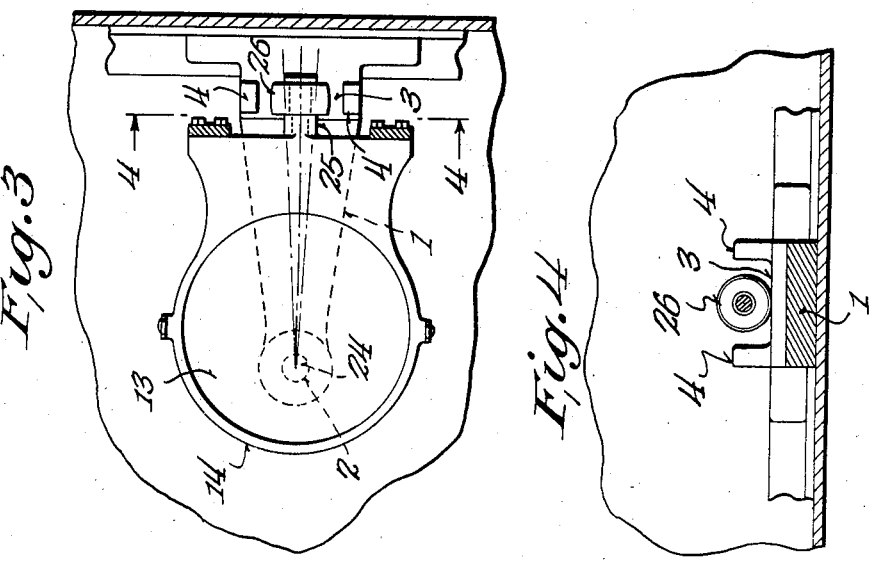
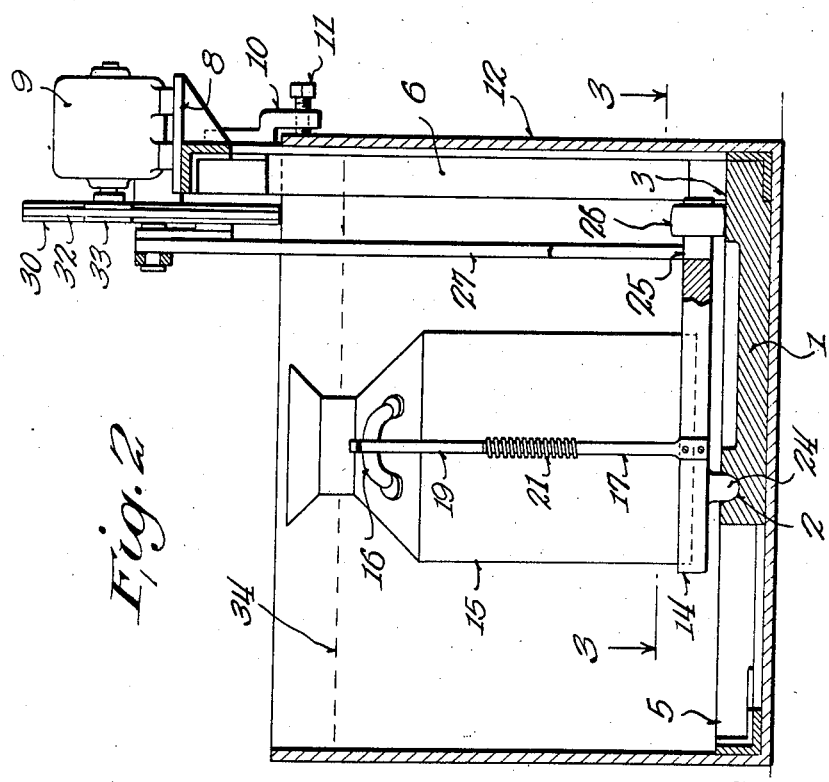
INVENTOR.
EMIL W. KRUG
BY
ATTORNEY Dec. 12, 1939.   E. W. KRUG   2,183,221
COOLING DEVICE FOR LIQUIDS
Filed Aug. 25, 1938   3 Sheets-Sheet 3
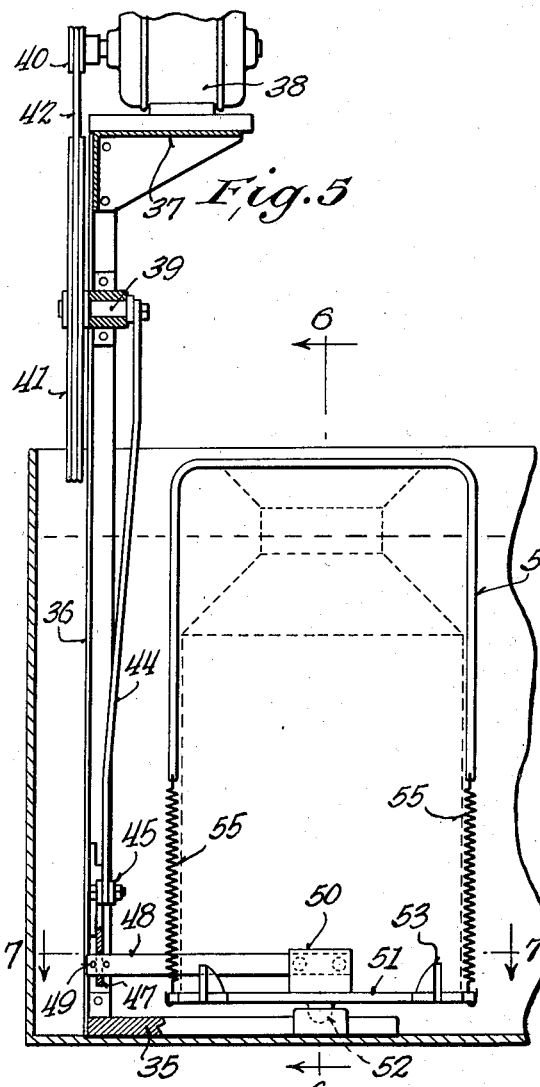
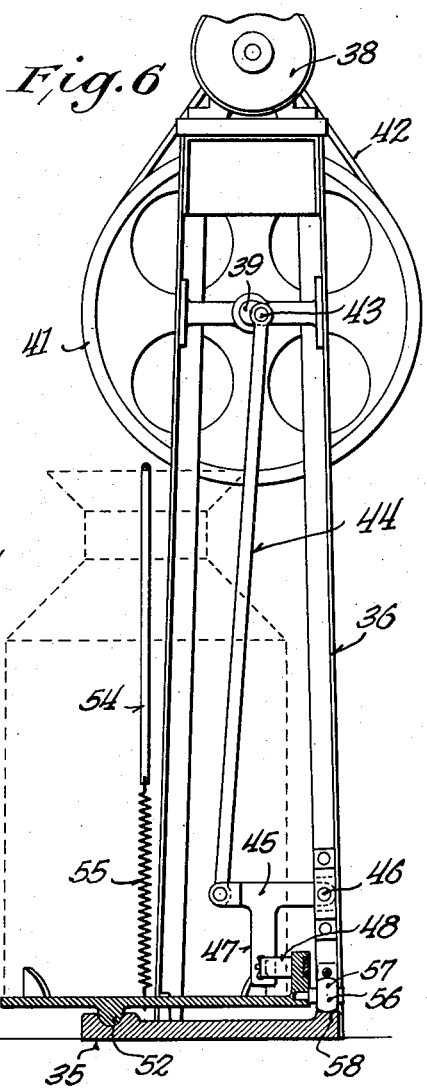
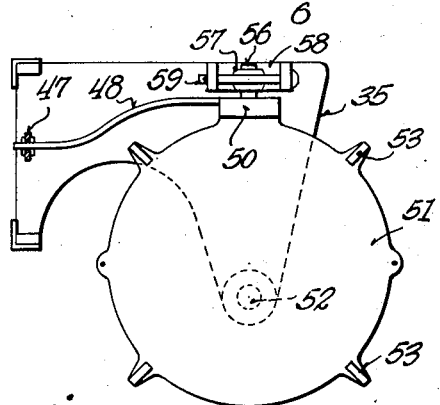
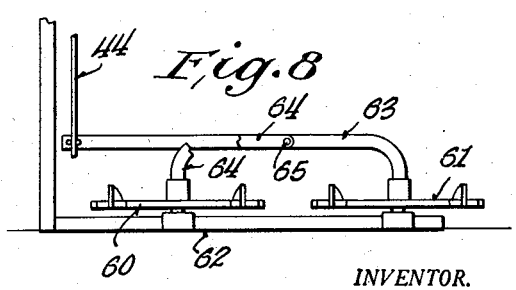
INVENTOR.
EMIL W. KRUG
BY
ATTORNEY Patented Dec. 12, 1939

2,183,221

UNITED STATES PATENT OFFICE 2,183,221

COOLING DEVICE FOR LIQUIDS

Emil W. Krug, Manitowoc, Wis.; A. J. Kempfert, Manitowoc, Wis., administrator of Emil W. Krug, deceased Application August 25, 1938, Serial No. 226,623

11 Claims. (Cl. 257—75)

This invention relates to a device for cooling liquids and is particularly directed to a milk cooling device.

In cooling easily contaminated liquids whose temperature must be quickly reduced, as in fresh milk, to prevent the rapid growth of bacteria, the practice has usually been to provide some cooling means that is inserted into the milk or to allow the milk to run through a cooling member or over a cooling member. In following these methods the milk is often exposed to the air and it becomes difficult to prevent the milk from picking up extraneous contamination, and in all cases where the milk contacts with a cooling member or a cooling surface, rigid requirements for sterilizing and cleaning such member or surface have to be imposed. As there is no adequate way in which this sanitary requirement can be enforced, it often happens that the cooling means is not adequately cleaned, thus resulting in contamination of the milk.

This invention is designed to fulfill the sanitary requirements in a simple and adequate manner and objects of this invention are to provide a novel form of cooling device, particularly for milk, which is so made that the standard container, for instance the usual type of milk can, does not have to be opened, in which no outside or auxiliary cooling member has to be inserted into the milk, but in which a closed milk can or liquid container is used and in which the milk or other liquid is caused to circulate within the milk can so that all portions repeatedly contact with the inner side walls of the can, and in which cooling water on the outside of the can is kept in constant circulation about the outside walls of the can, all of these functions being obtained in a simple manner and requiring an inexpensive equipment.

In greater detail, further objects are to provide a milk cooling device in which a tank for the cold water is provided, in which means are provided for rocking one or more milk cans while partly submerged in the cooling water, and in which a peculiar motion is imparted to the milk cans so that the milk not only rocks back and forth in the can but also rotates or circulates within the can causing all portions thereof to repeatedly contact with the chilled walls, and in which the peculiar motion of the can causes a steady circulation of the cooling water about the can.

Further objects are to provide a milk cooling device which can be quickly detachably attached to a tank for the cooling water, which has a rocking support for the milk can that is provided with quickly applied and released means for locking a standard milk can to the support, and in which power means are provided for both rocking the support and for giving it a twisting or turning motion back and forth about an approximately vertical axis, the device forming a unitary, readily removable structure so that it may be placed within or removed from the tank with the utmost ease.

An embodiment of the invention is shown in the accompanying drawings, in which:

Figure 1 is a longitudinal sectional view through the device with parts broken away and in section.

Figure 2 is a transverse sectional view on the line 2—2 of Figure 1.

Figure 3 is a fragmentary sectional view on the line 3—3 of Figure 2 with the can removed.

Figure 4 is a detail sectional view taken on the line 4—4 of Figure 3.

Figure 5 shows a further form of the invention with parts broken away and in section.

Figure 6 is a sectional view on the line 6—6 of Figure 5 with the tank omitted.

Figure 7 is a sectional view on the line 7—7 of Figure 5 with the springs and tank omitted.

Figure 8 is a side elevation of the bottom part of a further form of the apparatus with parts omitted.

Referring to the drawings, it will be seen that the device comprises a base portion, which includes one or more arms or projecting portions 1, which is provided with a socket bearing 2 and with a runway or guide surface 3 preferably provided with a pair of lugs 4 projecting upwardly therefrom. This base portion also includes the angle iron or other side frame member 5 from which a vertical upright 6 and a slanting upright 7 extend. These uprights 6 and 7 support the upper platform portion 8 which carries a motor 9. Downwardly projecting lugs 10, see Figures 1 and 2, may be provided and each may be equipped with a clamping screw 11 or other suitable means whereby it may be detachably attached to the side wall 12 of the cooling tank. It is to be noted that the device may be made either single or for multiple units, as desired.

It is to be distinctly understood that the framework or body portion of the device including the base may be changed as desired. It is preferable, however, to make the device very simply and in an economical manner. It should preferably be, as indicated, detachably attached to the cooling tank 12 so that it may be lifted out when desired.

As many units as needed may be employed. In the form shown, two units have been indicated, though the device may be a single unit device or may be for two, three or any number.

All of the container holding devices are similar and a description of one will be sufficient. The container holding device is shown in plan in Figure 3 and it will be seen that it comprises a supporting base 13 which is provided with a flange 14 adapted to receive the liquid container, for example in the particular form chosen for illustration the milk can 15 provided with the handles 16 and with a tightly fitting closed top as is the customary practice.

These milk cans are seated on the base 13 within the flange 14 and are thus retained in place at their lower portion. In order to detachably clamp the milk cans to the base, spring clamping members are provided which may take the form of a metal strap member 17 secured on opposite sides of the container support 13 and having outwardly turned upper ends 18. A strap member 19 is slidably associated with the strap member 17 and is provided with a lower outwardly turned angular portion 20. Between the portions 18 and 20 an expansion spring 21 is positioned so that the strap member 19 is rigidly held downwardly by the spring. The strap member 19 has rigidly secured thereto a hook like portion 22 which hooks over the handle 16 of the milk can. Preferably the strap member 19 is provided with an outwardly turned hand grip 23 so that it may be readily pulled up in attaching or detaching the can.

Each of the base members is provided with a downwardly projecting bearing lug 24 which has a rounded bottom seated within the socket 2. The base members are each provided with an outwardly projecting arm 25 which carries a roller 26 adapted to ride on the bearing surface or guide surface 3, as shown in Figures 2, 3 and 4 so that there is a limited rocking motion about the axis of the supporting lug 24 whose purpose will hereinafter appear.

A rock arm 27 extends upwardly from the base and may be made in the form of an inverted V, as shown in Figure 1, to secure the necessary rigidity. These rock arms 27 are joined by a connecting link 28 so that they will oscillate back and forth in unison. The left-hand rock arm 27 as viewed in Figure 1 is operatively connected to the crank pin 29 of a pulley 30 by means of the connecting rod 31. The pulley 30 is connected by a belt 32, or in any other suitable way, with a small pulley 33 on the shaft of the motor 9.

In using the device, the milk cans are filled with fresh warm milk and their tops securely positioned. Thereafter the tops are not again removed and consequently the milk cannot become contaminated from outside sources, such as the air or by contacting any portion of the apparatus.

The milk cans are immediately placed on their supports 13, the cooling tank 12 being filled with cold water to about the line indicated by the reference character 34. The operator lifts the hooks 22 upwardly by grasping the hand grips 23 and positions the hooks 22 over the handles 16 of the milk cans 15. The motor is then started and the milk cans are rocked back and forth about their projecting pivots or pivot bearings 24 which are seated within the socket bearings 2. However, it is to be noted that the rock arm 27 for each container support is offset with reference to the pivot bearing and also the pivot bearing is offset with reference to the center of gravity of the filled milk cans. It will be seen, therefore, that as the rock arms 27 are oscillated back and forth, that there is also a limited rotary motion imparted to the supports 13 and consequently to the milk cans 15, as the roller 26 rides back and forth along the guide or supporting surface 3.

It has been found that the milk within the milk cans not only rocks back and forth but also gets a rotary motion and all portions of the milk are brought into contact with the interior chilled walls of the milk can.

Another peculiar effect has been noted, namely, that as the milk cans are rocked back and forth and given this limited rotary motion first in one direction for one rocking motion and then in the other direction for the other rocking motion, that the water also circulates in the cooling tank 12. It has a slow travel around the cooling tank and thus any water that becomes slightly warm after contact with the surface of the can is immediately swept away and fresh cool water is caused to contact with the can. If desired, an overflow and a constant supply of fresh water, neither of which has been shown, could be furnished in the usual manner.

It will be seen that a very pronounced advantage that this device has is that the milk is immediately cooled without being exposed to the outside air and without contacting with any other portion of the apparatus than the interior walls of the milk can where it is to be kept. There is, therefore, no chance of outside contamination and additionally there is a very rapid cooling of the milk due both to the rotary and oscillatory motion of the milk and the repeated contact of all portions of the milk with the inner chilled walls of the can and also due to the fact that the water within the tank is continually circulated due to the operation of the apparatus.

Referring to Figures 5, 6 and 7, it will be seen that the device comprises a base 35 which supports a frame 36, the frame carrying at its upper end a support 37 for the motor 38. The motor drives the crank shaft 39 in any suitable manner as by means of the pulleys 40 and 41 joined by the belt 42, although any other suitable means of reduction may be employed. The crank 43 is connected by means of the connecting rod 44 with one arm of a bell crank lever 45 which is pivotally mounted at 46. The bell crank lever is provided with a lower arm 47 which is slotted and which loosely receives the lever or arm 48. Preferably pins 49 are carried by the arm 48 and are located on opposite sides of the downwardly extending arm 47 of the bell crank lever 45.

The lever or arm 48 is rigidly attached to a bracket 50 rigid with the rocking milk can support 51, such support being provided with a downwardly extending rounded projecting member 52 socketed in the base 35. Preferably the milk can support 51 is provided with a plurality of positioning lugs 53 around its periphery for positioning the milk can and if desired a U-shaped strap 54 may be connected with the support 51 by means of springs 55, such strap 54 being positioned over the top of the milk can and holding it securely in position, the milk can being indicated in dotted lines in Figures 5 and 6.

An inspection of Figure 7 will show that the arm 48 is curved and operatively connects to the arm 47 of the bell crank lever 45 at a point spaced inwardly from the lug 50 of the support 51. The base 51 is provided with a laterally projecting pin 56 which carries a supporting roller 57 that rides upon a guide 58, a transverse rod 59 being preferably provided immediately above the roller 57 to prevent inadvertent lifting of the roller from the guide 58. It is to be noted that the bearing or supporting pin 52 of the support 51 is mounted off center, as shown in Figure 7, so that such pin is not arranged on the axis of the supported milk can but is laterally displaced therefrom. A part of the weight of the filled milk can, therefore, is carried by the roller 57.

In using the apparatus the milk can immediately upon being filled with warm milk is placed on the support 51 and the U-shaped strap 54 is positioned over the top of the milk can to securely hold it in place, it being understood, of course, that the device is mounted in a suitable vat or tank, such as indicated at 12 in Figures 1 and 2. This tank or vat is filled with cold water to about the position shown in Figure 2.

When the motor is started, the bell crank lever 45 pivots about the point 46 and the downwardly extending arm 47 rocks laterally, as viewed in Figure 6, and also has an up and down motion. The result of this is that the end of the arm 48 is not only raised and lowered, see Figure 7, but also is rocked transversely, thus rocking the milk can back and forth and also giving it a slight oscillatory or rotary motion so that the milk is caused to travel within the can as previously described and so that all portions of the milk contact the chilled side walls of the can, due to the combined rocking and rotary motion imparted thereto.

This form of the invention may also be applied to a plurality of rocking devices. For example as shown in Figure 8, a pair of supports 60 and 61, corresponding to the support 51 and equipped with the springs 55 and strap 54 not shown in Figure 8, are provided and are pivoted off center in exactly the same manner as the support 51, the base 62 being elongated to accommodate the extra milk can support. The connecting rod 44 is operatively coupled to the arm 63, which is rigid with the support 61, and at a point approximately midway between the supports 60 and 61 a lever 64 rigid with the support 60 is pivotally connected to the lever 63, as indicated at 65. It is obvious that as the arm 63 is rocked, the point 65 moves up and down and also moves transversely, thus giving a rocking and rotary or oscillatory motion to the milk can support 60. The milk can support 61 has substantially the same motions of rocking and rotary motion as described for the support 51 of Figure 7.

It is obvious that the invention could be applied to more than two milk can supports. For example, if a third milk can support were employed, the arm 63 would still be rigidly connected to the milk can support 61 and would be extended to the right, as viewed in Figure 8, and connected to a third milk can support as it was connected to the milk can support 60.

In this manner a plurality of milk cans can be handled simultaneously and each milk can will be given a rocking and rotary motion, thus insuring quick and adequate chilling of the milk.

It will be seen further that the devices are of very simple construction and can be readily made at a small cost.

It is to be understood that other constructions could be employed provided the principle of the invention were followed. Other mountings for the motor or other means of driving the crank could be provided if desired and, of course, other means of attaching the device to the tank could be furnished. It is desirable, however, to have the device of simple construction and one that has very few parts and may be readily positioned within and removed from the tank. It is to be understood that any of the several forms of the device may be detachably locked to the tank, as has been shown for the first form, or may be merely seated within the tank as has been shown for the latter forms.

Although this invention has been described in considerable detail, it is to be understood that such description is intended as illustrative rather than limiting, as the invention may be variously embodied and is to be interpreted as claimed.

I claim:

1. A cooling device for liquids comprising a tank for cooling water, a liquid container located within the tank, and power means for moving said container back and forth within said tank and for imparting an oscillatory motion to said container about an approximately vertical axis.

2. A milk cooling device comprising a base portion, a milk can supporting member journalled on said base portion, means carried by said supporting member for detachably locking a milk can to said member, power means, and a rocking member connected to said supporting member and operatively connected to said power means for rocking said supporting member, said rocking member being connected off center with respect to said supporting member and said supporting member having a limited rotary motion about an approximately vertical axis.

3. A milk cooling device comprising a base portion, a milk can supporting member journalled on said base portion, means carried by said supporting member for detachably locking a milk can to said member, power means, a rocking member connected to said supporting member and operatively connected to said power means for rocking said supporting member, said rocking member being connected off center with respect to said supporting member and said supporting member having a limited rotary motion about an approximately vertical axis, and means for limiting the rotary motion of said supporting member.

4. A liquid cooling device comprising a tank for cooling water, a socket bearing located within said tank, a container supporting member pivoted on said socket bearing for rocking motion and for rotary motion, a rock arm extending upwardly from said supporting member and placed off center with respect to said socket bearing, and power means for oscillating said rock arm.

5. A liquid cooling device comprising a tank for cooling water, a socket bearing located within said tank, a container supporting member pivoted on said socket bearing for rocking motion and for rotary motion, a rock arm extending upwardly from said supporting member and placed off center with respect to said socket bearing, and power means for oscillating said rock arm, said supporting member having means for locating a container off center with respect to said socket bearing and for holding said container to said supporting member.

6. A liquid cooling device comprising a base portion adapted to be placed within a tank for cooling water, said base portion having a supporting bearing and having a runway portion spaced from said supporting bearing, a container supporting member supported from said bearing and having a projecting arm supported from said runway portion, a rock arm located off center with respect to said supporting bearing and rigid with said container supporting member and projecting outwardly therefrom, and power means for oscillating said rock arm.

7. A liquid cooling device comprising a base portion adapted to be placed within a tank for cooling water, said base portion having a supporting bearing and having a runway portion spaced from said supporting bearing, a container supporting member supported from said bearing and having a projecting arm supported from said runway portion, a rock arm located off center with respect to said supporting bearing and rigid with said container supporting member and projecting upwardly therefrom, and power means for oscillating said rock arm, said power means being supported from said base portion.

8. A liquid cooling device comprising a base portion adapted to be placed within a tank for cooling water, said base portion having a supporting bearing and having a runway portion spaced from said supporting bearing, a container supporting member supported from said bearing and having a projecting arm provided with a roller supported from said runway portion, a rock arm located off center with respect to said supporting bearing and rigid with said container supporting member and projecting outwardly therefrom, and power means for oscillating said rock arm.

9. A liquid cooling device comprising a tank for cooling water, a socket bearing located within said tank, a container supporting member pivoted on said socket bearing for rocking motion and for oscillatory motion about different axes, a rock arm rigidly secured to said container supporting member, and a power driven member operatively connected to the outer end of said rock arm, said member imparting both lateral and vertical motion to the outer end of said rock arm.

10. A liquid cooling device comprising a tank for cooling water, a socket bearing located within said tank, a container supporting member pivoted on said socket bearing for rocking motion and for oscillatory motion about different axes, a rock arm rigidly secured to said container supporting member, and a power driven member operatively connected to the outer end of said rock arm, said member imparting both lateral and vertical motion to the outer end of said rock arm, said bearing support being placed off center with reference to said container supporting member.

11. A liquid cooling device comprising a tank for cooling water, a bearing located within said tank, a container supporting member pivoted on said bearing for rocking motion and for oscillatory motion about different axes, a rock arm rigidly secured to said container supporting member and having a projecting end, a lever pivotally mounted adjacent said end of said rock arm and operatively connected to said end of said rock arm, said lever causing said end of said rock arm to move laterally and vertically, whereby rocking and oscillatory motion is imparted to said container supporting member, and power means for rocking said lever.

EMIL W. KRUG.